Oct. 29, 1968  L. WINTON  3,408,068
ROUNDABOUT AMUSEMENT DEVICE
Filed Sept. 29, 1965
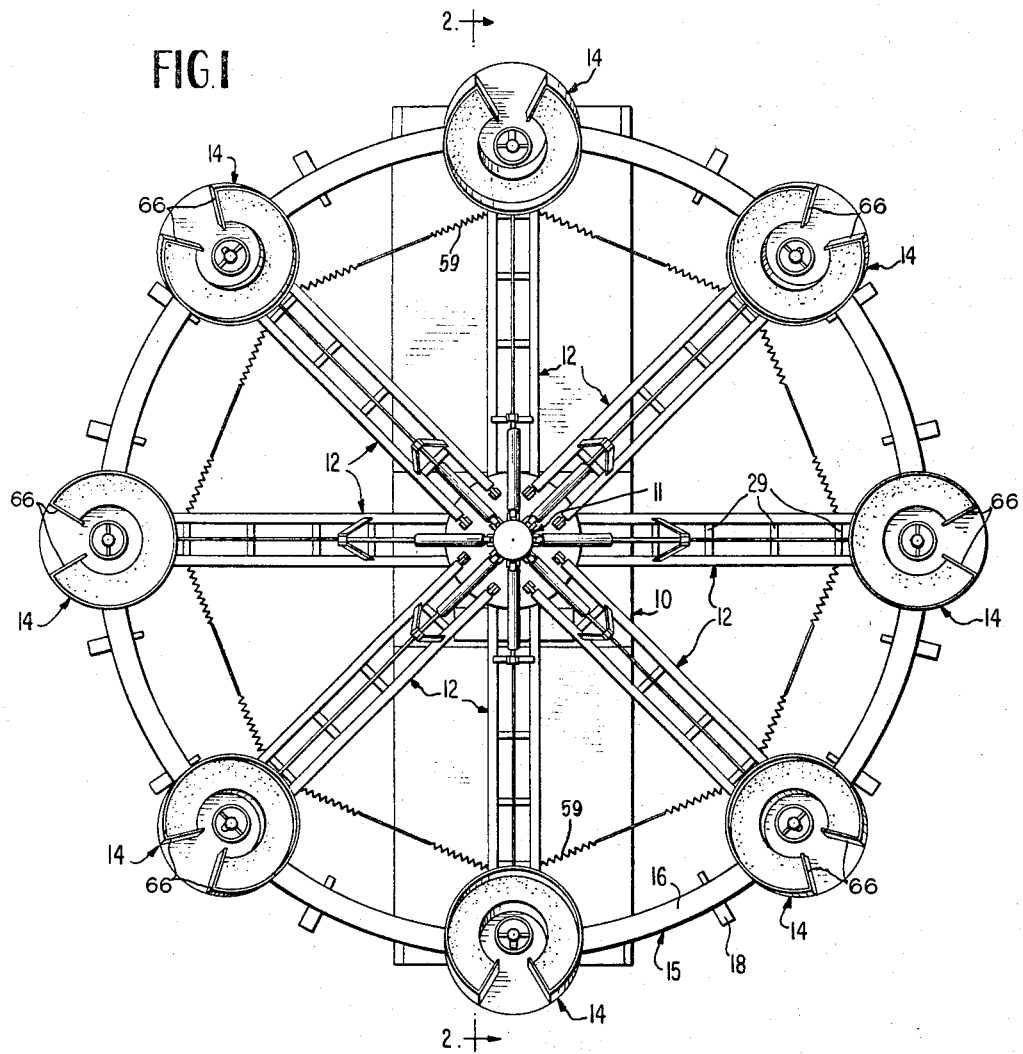
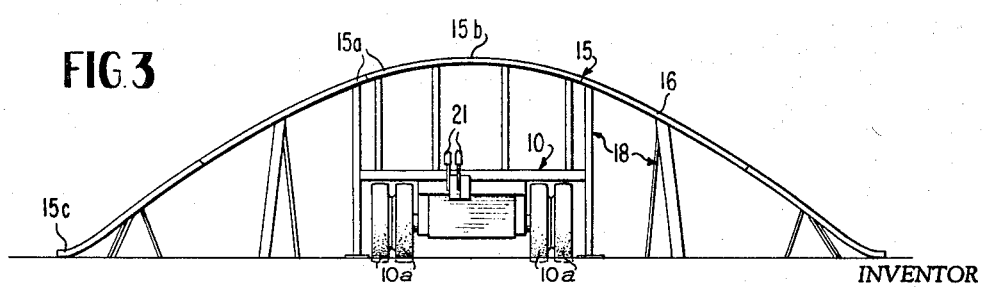
INVENTOR
Lavoy Winton Oct. 29, 1968  L. WINTON  3,408,068
ROUNDABOUT AMUSEMENT DEVICE
Filed Sept. 29, 1965  3 Sheets-Sheet 2

INVENTOR
*Lavoy Winton*

BY *Newton, Hopkins, Jones & Ormsby*

ATTORNEY

Oct. 29, 1968   L. WINTON   3,408,068
ROUNDABOUT AMUSEMENT DEVICE
Filed Sept. 29, 1965   3 Sheets-Sheet 3

INVENTOR
Lavoy Winton
Newton, Hopkins,
Jones & Ormsby
ATTORNEY

United States Patent Office 3,408,068
Patented Oct. 29, 1968

3,408,068
ROUNDABOUT AMUSEMENT DEVICE
Lavoy Winton, 241 S. Clayton St.,
Mount Dora, Fla. 32757
Filed Sept. 29, 1965, Ser. No. 491,123
9 Claims. (Cl. 272—44)

ABSTRACT OF THE DISCLOSURE

An easily erected roundabout mounted upon a trailer support and including an undulating track upon which roller equipped radial support arms travel while carrying freely rotatable passenger cars. The roundabout is characterized by constantly acting positive pressure means to maintain the roller equipped arms in firm contact with the undulating track.

---

This invention relates generally to amusement devices and more particularly to a roundabout amusement device that is trailer mounted so as to be highly portable and which transports passengers thereon along an annular undulating path while independently rotating said passengers about a second circular path at a rate of rotation controllable by said passengers.

It is old in the art to transport passengers along an undulating annular path so that rapid accelerations and decelerations are encountered as the passengers travel around this annular path. Prior art devices having an annular undulating track over which passenger cars are transported have been limited by the fact that very rapid changes in the slope of the track have caused the cars to tend to pivot on the arms connecting the car to the central column so as to leave the track. This has serious consequences unless means for slowly returning the car to the track are provided. Moreover, prior art devices of the type hereinabove described have, in many instances, required a considerable length of time to set up the device for operation and disassemble the device for transportation to another location.

This invention has a novel feature in that it is constructed on a trailer as an integral part thereof so that little assembly and disassembly time is needed when the device is to be moved from one place to another. This feature is important since the device must be moved numerous times over the show circuit during a season's run. The driving assembly of the invention is carried on the bed of the trailer and portions of the track upon which the passenger cars are carried are fixedly mounted on the trailer. Moreover, each of the passenger cars can be easily stored upon the trailer and those portions of the track not fixedly mounted on the trailer are easily stored on the trailer for transportation to new locations.

Another novel feature of the invention is that a means is provided to prevent the passenger cars from leaving the track as they are moved therealong. The means comprises a hydraulic system which has a hydraulic cylinder associated with each arm which exerts a constant downward pressure on the associated arm. This pressure which is, of course, selectively maintained, is sufficient to insure that each arm and its associated passenger car contacts the undulating track at all times.

The passenger cars are rotatably carried upon arms pivoted about a common central column so that the passenger cars are freely rotatable about axes perpendicular to the arms which carry the cars. Since the cars are inherently loaded eccentrically of their axes of rotation, the cars will rotate about their axes of rotation under the influence of gravity as the axes of rotation of the cars change when the arms rotate with the central column in an undulating manner. Thus, the cars tend to rotate about their own axes as they rotate about the axis of rotation of the central column.

Another novel feature of the invention is a wheel provided in the center of each of the circular passenger cars and fixed to the arm carrying the car so that the wheel does not rotate with the car. The occupant may grasp the wheel and control the rotation of the cars about their axes of rotation. The passengers may also grasp the wheel and impart a rotating motion to the cars about their axes.

The circular cars are novel in that the access opening into the car through which the passengers enter is a sector of the car so that a pair of safety plates oriented along radii of the car on either side of the access opening provide a narrow opening at the inner ends thereof so as to preclude inadvertent discharge of the passengers from the cars while the invention is in operation.

Manually operable braking means is another novel feature of the invention which retains the passenger cars in a fixed relationship with respect to the arms upon which the cars are rotatably carried so as to fix the cars with respect to the arms. This serves to prevent movement of the cars during loading and unloading of passengers and to selectively fix and release the cars for rotation with respect to the arms.

Another novel feature of the invention is spring means provided between the extending ends of adjacent arms. The spring means tend to force one arm of the invention upwardly and the adjacent arm of the invention downwardly as the arms travel around the central axis and over the undulating track so that the upwardly moving arm is forced downwardly and the downwardly moving arm is forced upwardly to assist the hydraulic system in keeping the arms on the track.

Still another novel feature of the invention is that a boom pivotably mounted at the upper extending end of the vertical support column is positionable with respect to the radially extending arms to provide a lifting means for assembling and disassembling the invention at each stop in the show circuit.

These and other features and advantages of the invention will become more apparent under consideration of the following specification and the accompanying drawings wherein like characters of reference designate corresponding parts throughout and in which:

FIG. 1 is a top plan view of one embodiment of the invention;

FIG. 3 is an end view of the track used in the invention;

Figure 2:
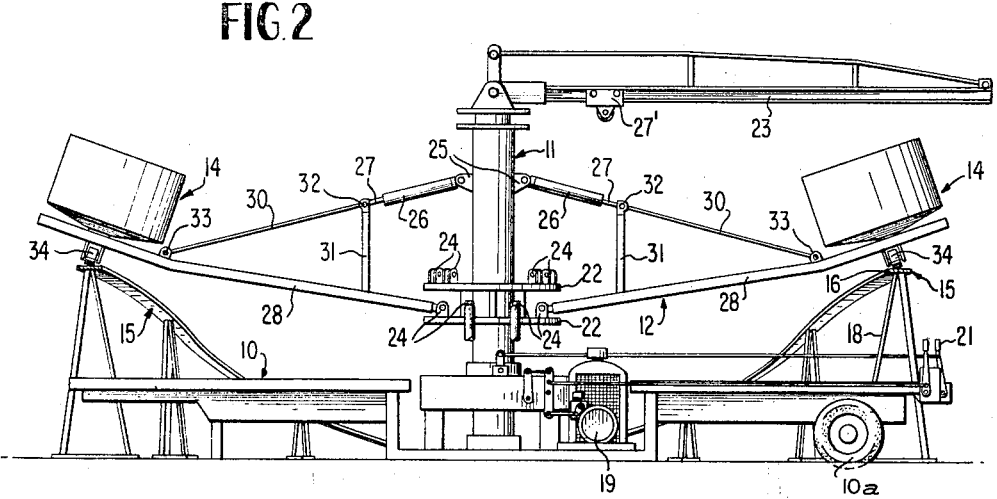
FIG. 2 is a side elevational view of the embodiment of the invention of FIG. 1 showing some of the arms removed from the central column and part of the track in section for clarity.
Figure 4:
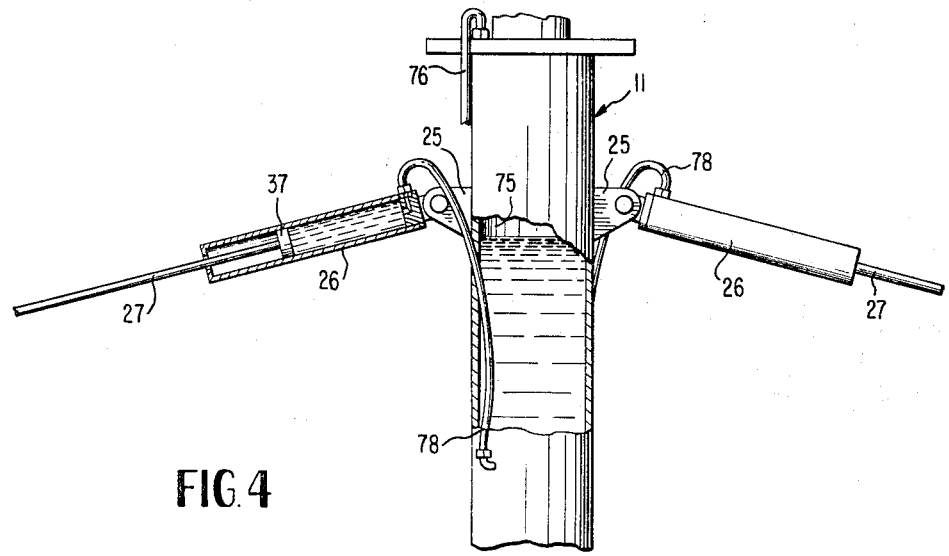
FIG. 4 is a partial view of the central column of the invention showing the connection with the hydraulic cylinders to the arms.

These figures and the following detailed description disclose one specific embodiment of the invention; however, it is to be understood that the present inventive concept does not limit itself to the specific details set forth herein since the invention may be embodied in other specific forms.

The invention comprises generally a trailer or like vehicle 10 supported for roadway travel on wheels 10a which serves as a mounting bed, a rotatable central column 11, a plurality of arms 12 pivoted on and rotatable with the column 11, a plurality of cars 14 carried by the arms 12, and an annular undulating track 15.

The track 15 is circular and presents a circular undulating runway 16 upon which the outer ends of the arms 12 ride, as will be explained hereinafter. The track 15 is made in a plurality of portions 15a so that it may be easily disassmbled for storage on the trailer 10. Although different undulating shapes may be used, the particular track 15 shown herein has two crests 15b and two valleys 15c, the crests 15b being portions of the track 15 which are permanently mounted on the ends of the trailer 10. These permanently attached portions 15a form a reference upon which assembly of track 15 may be started each time the invention is to be set up for operation. The runway 16 is carried upon support stanchions 18, some of which are permanently fixed to the trailer 10 and some of which are pivoted on the runway 16 so as to collapse when the track 16 is disassembled for transporting between locations.

The central column 11 is rotatably carried in a recessed portion 20 of the trailer 10 and is positioned so that it lies at the geometric center of the annular track 15. Power means 19 is provided in the recess 20 for rotating the central column 11, this power means 19 being any convenient means, such as an engine and transmission arrangemet. The power means 19 is provided with conventional hand controls 21 for starting and stopping the rotation of the central column 11 and for controlling the speed of rotation of the central column 11.

The central column 11 is a substantially vertically-extending cylinder and carries a pair of lower mounting plates 22 having a plurality of bearings 24 spaced therearound to receive the inner ends of the arms 12 which are adapted to be pivoted at the bearings 24 in conventional manner. A plurality of hydraulic connectors 25 are provided at the upper portion of the column 11 to pivotably receive the inner ends of hydraulic cylinders 26 associated with the arms 12.

The upper end of the column 11 pivotably receives therein a boom 23 having a slidable pulley 27 thereon for use in removing the passenger cars 14 from the track 15. The boom 23 is positioned so that it may be pivoted upward into a vertical position whereby lights (not shown) may be attached thereto during the operation of the device at a particular location. The boom 23 is also freely rotatable with respect to the column 11 so that removal of the cars 14 may be easily accomplished.

The arms 12 comprise generally a pair of parallel members 28 pivotably attached to the bearings 24 at their inner ends and extending outwardly over the track 15. The members 28 are joined together by cross bars 29 in known manner so that the pair of members 28 and the cross bars 29 of a particular arm 12 form a rigid beam pivoted at one end and rotatable with the central column 11.

A truss rod 30 is pinned at 33 inwardly of the outer ends of the members 28 and extends upwardly and inwardly to be pinned at the junction 32 with upwardly extending ends of a pair of truss uprights 31 which are attached to the members 28 just outwardly of their inner ends pivoted at the bearings 24. The truss rod 30, the truss uprights 31 and the members 28 form a triangle so that no relative movement of the junction 32 between the inner end of the truss rod 30 and the truss uprights 31 is stationary with respect to the members 28. The junction 32 has attached thereto a piston rod 27 of the hydraulic cylinder 26 pinned to the connectors 25 as hereinbefore described. It will now be seen that as the members 28 of the arm 12 pivot at their inner ends, the piston rod 27 is moved into and out of the hydraulic cylinder 26 to move a piston 37 therein. It is undernstood, however, that each of the remaining arms 12 are identical to the arm 12 just described and thus have corresponding parts.

Positioned below each of the arms 12 and overlying the track 15 is a track wheel 34 rotatably carried by a yoke 35 which is resiliently connected to the arm 12 through a mounting plate 38 which is fixedly attached to the members 28 of the arm 15. The yoke 35 is attached to a pair of leaf springs 36 which are pivoted at one end to the mounting plate 38 and resiliently ride against a bearing surface 43 of the mounting plate 38 at their other ends.

A retaining pin 39 is provided under the freely movable ends of the springs 36 to preclude the springs 36 from pivoting substantially away from the mounting plate 38 when the arm 12 is lifted above the track 15. The wheel 34 is preferably of a construction having rubber or similar material as a bearing surface which rides on the runway 16 so as to provide a quiet and efficient operation.

The central column 11 is provided with a fluid reservoir 75 that communicates with pressurized fluid such as compressed air through the pipe 76 and is partially filled by hydraulic fluid. Below the upper level of the hydraulic fluid and communicating therewith is a flexible hydraulic pipe 78 which also communicates with the hydraulic cylinders 26. The pipe 78 is connected to the hydraulic cylinders 26 in such a manner that the pressurized hydraulic fluid from the reservoir 75 always forces the pistons 37 of the hydraulic cylinders 26 away from the central column 11. Each of the arms 12 are forced downwardly until the wheel 34 associated with each of the arms 12 contacts the track 15. Therefore, the arms 12 rotate with the central column 11, the hydraulic fluid and the hydraulic cylinders 26 force the arms 12 downwardly so that the wheels 34 are always in contact with the undulating track 15.

Extending between the members 28 directly above the mounting plate 38 is a car support 40, and centered on the car support 40 is the bearing boss 41. Extending upwardly from the bearing boss 41 and substantially perpendicular to the arm 12 is a shaft 42 carrying a steering wheel 44 at its upper end. The bearing boss 41 has an upper bearing surface 45 and a circualr side bearing surface 46 as will be explained hereinafter.

Rotatably carried by the bearing boss 41 and the shaft 42 is the passenger car 14. The car 14 comprises a support platform 48 which has a circular flat disc portion 49 and a bearing housing 50 at the center of and integral with the disc portion 49. The housing 50 has a circular recess in the lower side thereof just sufficient to receive the support boss 41 therein and a hole extends from the recess upwardly through the housing 50 so that the housing 50 may be inserted over the shaft 42 and rest upon the support boss 41. Conventional bearings 47 are carried by the housing 50 are around and on top of the support boss 41 as well as around the shaft 42 so that the platform 48 is freely rotatable about the support boss 41 and the shaft 42.

Figure 5:
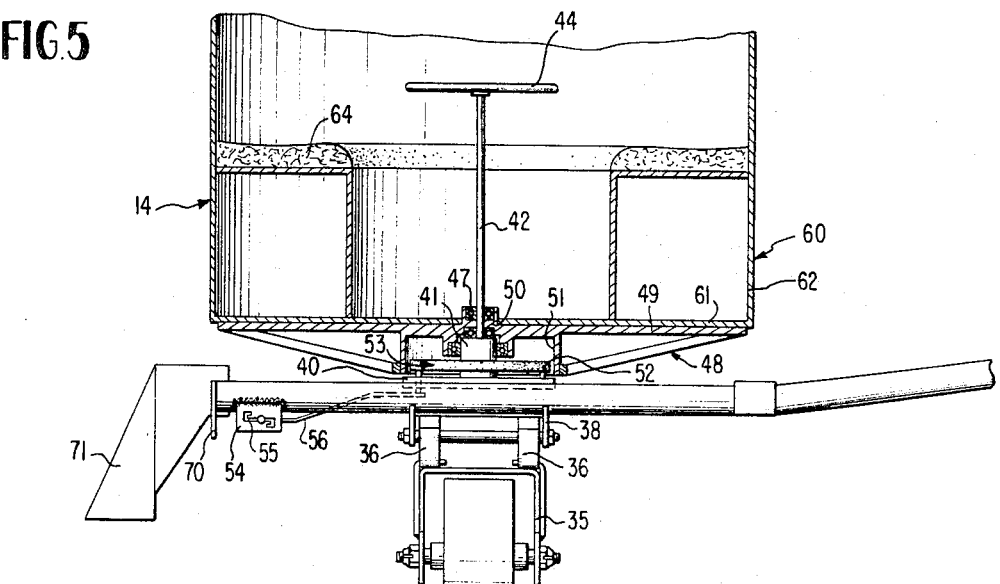
FIG. 5 is a partial cross-sectional view of one of the passenger cars showing its connection to the arm and means for restraining the rotational movement of the car about its rotational axis.
Figure 6:
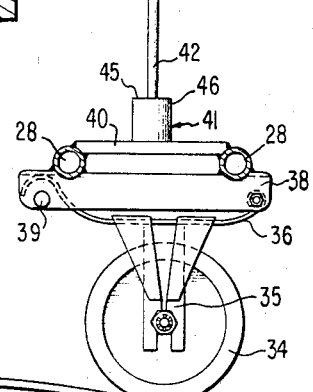
FIG. 6 is a partial sectional view of one of the arms of the invention showing the connection of the track wheel thereto; and, FIG. 7 is an exploded view showing the connection of the passenger stirrup with the extending end of each of the arms of the invention to allow passengers to board the passenger cars.
Figure 7:
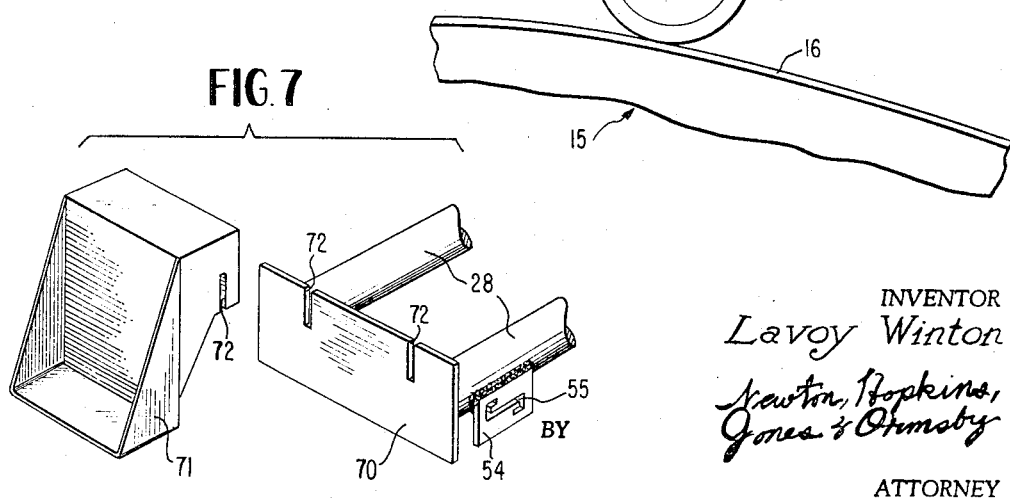

Also integral with the platform 48 and extending downwardly therefrom as seen in FIG. 5 is an annular brake drum 51 concentric with the boss 41. Thus, as the platform 48 rotates about the support boss 41 and the shaft 42, the drum 51 rotates about the support boss 41. A brake shoe system 53 of conventional type such as that used in an automobile is carried on the support plate 40 so that, when extended, the shoes 52 of the system 53 will contact the inside surface of the brake drum 51 and prevent rotation of the platform 48 with respect to the support boss 41.

Manual means herein shown as an engaging rod 56 is connected to the brake shoes 52 for engaging the shoes with the braking surface of the brake drum 51 so as to selectively fix the car 14 with respect to the arm 12 or release the car 14 for free rotation about the boss 41. A member having a slot 55 therein receives the engaging rod 56 therethrough so that, when the engaging rod 56 is held within one locked position on the plate 54, the brake shoes 52 will be in contact with the brake drum 51 so that the platform 48 is precluded from rotation whereas in the other locked position the platform 48 is freely rotatable about the bearing boss 41.

Fixedly carried on the platform 48 is a seat housing 60 having a flat, disc-shaped bottom wall 61 coinciding with and centered upon the platform 48 and an annular side wall 62 integral with the bottom wall 61 extending upwardly therefrom to a convenient height so as to form a surface for passengers to lean against while riding in the car 14. An annular seat 64 is carried within the housing 50 upon which passengers may sit while riding on the device.

An entrance or access 65 is provided in one side of the housing 50 so that a passenger may easily enter the cars 14 and safety plates 66 extend inwardly from either side of the entrance 65 along a radii of the housing 50. These plates 66 present a narrower opening at their inner ends than at their outer ends so that the car 14 may be easily boarded by a passenger standing up, yet it is difficult for a passenger to be discharged from the car 14 when in a sitting position on the seat 64.

The housing 50 with the seat 64 is freely rotatable with respect to the shaft 42 and the steering wheel 44 so that a passenger desiring to control the amount by which he will rotate about the shaft 42 while riding on the device may grasp the wheel 44 and, using the friction between his body and the seat 64, prevent the rotation of the housing 60.

A step support plate 70 joins the ends of the parallel members 28 and has removably carried thereon a step or stirrup 71 that may be removed during the operation of the device and replaced during the time the passengers are entering and disembarking from the passenger cars 14. A pair of interlocking slots 72 are provided in the support plate 70 and the stirrup 71 to accomplish this.

It is to be understood that all of the passenger cars 14 are identical to the one hereinabove described. Therefore, all of the cars 14 have corresponding parts.

A pair of springs 59 extend between the extending ends of each pair adjacent arms 12. These serve to assist the cylinders 26 maintain the wheels 34 on the track 15 by forcing the arms 12 toward equal pivotal positions with respect to the column 11.

When the device is at its location of operation, the wheels 10a may be received in ground recesses as shown in FIG. 2 thus disposing the central lower portion of the vehicle bed for support on the ground surface and avoiding any necessity for complete assembly or disassembly of the working parts. However, in maneuvering the arms and cars the boom 23 will be positioned in horizontal position as shown in FIG. 2 and the pulley 27' utilized to assist such maneuvering.

*Operation*

In operation, the power means 19 rotates the central column 11 when the hand controls 21 are properly manipulated by the operator. As the column 11 rotates, the arms 12 are also forced to rotate about the geometric center of the track 15 so that the outer ends of the arms 12 travel over the track 15 on the wheels 34.

As the wheels 34 follow the track 15 the arms 12 are forced to pivot with respect to the column 11 about the bearings 24 since the track 15 causes the wheels 34 to follow an undulating path. This, in turn, changes the position of the axes defined by the bearing bosses 41 about which the cars 14 rotate.

Since the cars 14 are always loaded eccentrically due to their particular construction, the changes in position of the axes cause the cars 14 to rotate. Therefore, as the central column 11 rotates, the cars 14 tend to rotate about their axes. In order that the passengers, if they do not desire the car 14 in which they are riding to rotate about its axis, may control the rotation of the car 14, they may grasp the steering wheel 44. The friction between the passengers' bodies and the seats 64 is sufficient to control the speed of rotation of the cars 14.

The fluid reservoir 75 is pressurized at all times during operation of the device by the compressed air through pipe 76. This causes the hydraulic fluid in the reservoir 75 to be forced through the pipes 78 and into the cylinders 26 so as to extend the piston rods 27 of the cylinders. The piston rod 27, in turn, exerts a force on the junction 32 of the arms 12 so that the wheel 34 always contacts the track 15. Therefore, no danger of the cars 14 causing the arm 12 to lift the wheels 34 off of the track 15 is encountered.

When the central column 11 is stopped from rotating, the operator may grasp the rod 56 and engage the shoes 52 with the drum 51 so as to preclude rotation of the car 14. He may then lock the rod 56 in the slot 55 so as to maintain the shoes 52 in engaged position. The passengers may then disembark from the cars 14. When new passengers have entered the car 14, the operator then releases the rod 56 so that the shoes 52 are disengaged from the drum 51 to permit free rotation of the car 14 about its axis.

It will be obvious to those skilled in the art that many variations may be made in the embodiments chosen for the purpose of illustrating the present invention without departing from the scope thereof as defined by the appended claims.

I claim:

1. In an amusement device having an annular undulating track, a central rotatable vertical column located concentrically of the track, power means for rotating said central column, an arm carried by said column and extending outwardly therefrom along a radius of said track to overlie a portion of said track, said arm being rotatable with said column and rotatable with respect to said column about a substantially horizontal axis, said arm having a rotatable wheel attached thereto on the underside thereof to contact said track and follow the undulations thereof, a passenger car mounted on said arm and arranged to freely rotate about an axis substantially perpendicular to the outer end of said arm, said car being provided with passenger accommodations so arranged that when the car is occupied, the center of gravity of the car is rendered eccentric to its axis of rotation, whereby the travel of the arm around the undulating track will cause the car to rotate about its axis relative to the arm, fixed means in said car about which said car rotates adapted to be grasped by a passenger carried in said car so as to control the rotation of said car about its axis relative to the arm, and hydraulic cylinder means pivoted to said column and connected with said arm and effective to force said arm downwardly with positive pressure against said track to insure contact between said arm mounted wheel and track at all times.

2. The apparatus of claim 1 having brake means associated with said arm and said car effective to fix said car with respect to said arm.

3. The apparatus of claim 2 having a plurality of said arms, spring means connecting the extending ends of said arms adapted to force said arms toward equal pivotal positions about said horizontal axis.

4. The apparatus of claim 2 wherein the brake means comprises a drum secured to the bottom of said car, an internal shoe within the drum shiftable to active and inactive positions therein, and a manual shoe operator on said arm near the outer end of the arm including a locking device for securing the shoe selectively in the active and inactive positions.

5. An amusement device of the roundabout type comprising in combination an undulating track which extends in an annular path, a centrally disposed substantially vertical axis rotary drive structure within the track, arms extending radially from the vertical axis drive structure in circumferentially spaced relation and pivoted to the drive structure on substantially horizontal pivot axes, wheel means carried by the arms near their outer ends engaging upon the undulating track and supporting the outer ends of the arms, a passenger car on each arm near the outer end of the arm and moving with the arm as the arm travels around the track and follows the undulations thereof, and a constantly effective positive pressure hold-down device interconnecting each arm and said vertical axis drive structure and maintaining firm contact between the wheel means of the arm and said track at all times during the passage of the arm around the track.

6. The apparatus of claim 5 wherein said positive pressure hold-down device for each arm comprises a one-way operating fluid pressure extensible cylinder-piston unit having a first connection with the arm and a second connection with said drive structure, and means for constantly pressurizing said unit during rotation of the drive structure and said arms around said track.

7. The apparatus of claim 6 wherein said rotary drive structure includes a fluid reservoir communicating with all of the cylinder-piston units of said arms, and additional means for pressurizing the fluid in said reservoir constantly during the operation of the apparatus.

8. The apparatus of claim 7 wherein said additional means comprises a connection for fluid under pressure leading into the top of said drive structure above the body of fluid contained in said reservoir.

9. The apparatus of claim 6 wherein said extensible cylinder-piston unit is disposed diagonally between said arm and the upper end portion of the drive structure.

References Cited

UNITED STATES PATENTS

| D. 174,295 | 3/1955 | Sneed | 272—34 X |
| 1,409,381 | 3/1922 | Johnson | 272—43 X |
| 1,583,287 | 5/1926 | Fisher | 272—44 |
| 1,952,822 | 3/1934 | Rose et al. | 272—44 |
| 3,078,090 | 2/1963 | Thomas | 272—29 |
| 3,086,774 | 4/1963 | Winton | 272—44 |
| 3,155,389 | 11/1964 | Winton | 272—44 |

FOREIGN PATENTS

| 727,233 | 3/1932 | France. |
| 410,633 | 3/1925 | Germany. |
| 215,238 | 5/1924 | Great Britain. |
| 409,905 | 5/1934 | Great Britain. |
| 612,305 | 11/1960 | Italy. |

ANTON O. OECHSLE, *Primary Examiner.*

A. W. KRAMER, *Assistant Examiner.*